Nov. 20, 1923.
H. F. H. RIED
UTENSIL FOR DISPENSING HEAVY FLUIDS
Filed Sept. 22, 1921
1,474,848
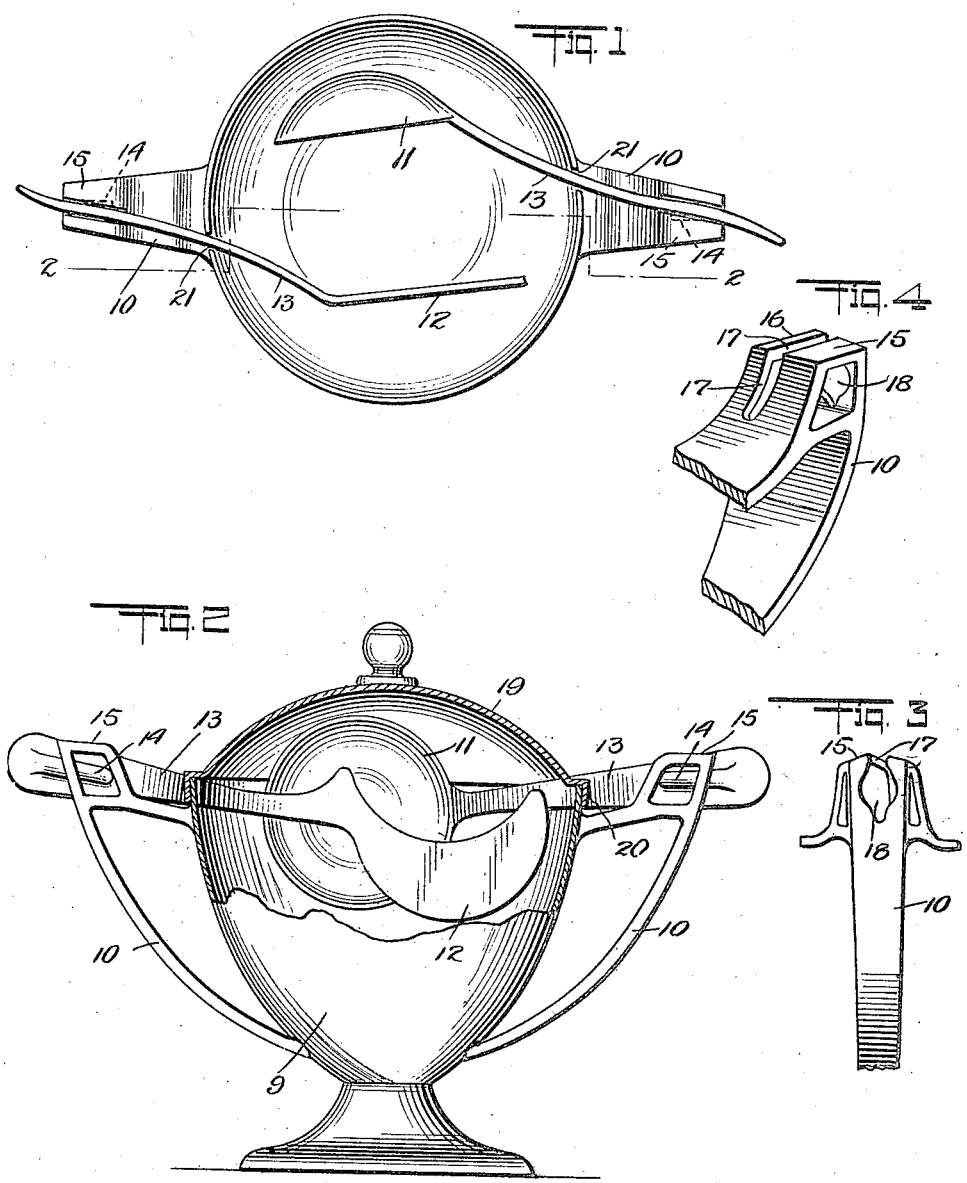
INVENTOR
Henrita F. H. Ried Patented Nov. 20, 1923.

1,474,848

UNITED STATES PATENT OFFICE.

HENRITA F. H. RIED, OF NEW YORK, N. Y., ASSIGNOR TO THE BORDEN COMPANY, OF NEW YORK, N. Y., A CORPORATION OF NEW JERSEY.

UTENSIL FOR DISPENSING HEAVY FLUIDS.

Application filed September 22, 1921. Serial No. 502,330.

*To all whom it may concern:*

Be it known that I, HENRITA F. H. RIED, a citizen of the United States, and a resident of the city of New York, borough of Manhattan, county and State of New York, have invented certain new and useful Improvements in Utensils for Dispensing Heavy Fluids, of which the following is a full, clear, and exact description.

Among the principal objects which the present invention has in view are: to enable one to dispense fluids of the character mentioned in quantities desired; to avoid the usual unsightly drippings or adhesions to the sides of the container; to attach to a container the dispensing elements employed therewith; and to maintain the said dispensing elements when not in use in desired relation to each other and to the container, whereby the drippings therefrom will drain back into the container.

*Drawings.*

Figure 1 is a top plan view of the container and dispensing device connected therewith and held in desired relation thereto;

Figure 2 is a side view of the same partly in section, the section being cut as on the line 2—2 in Figure 1 to show the construction and interior arrangement;

Figure 3 is a detail view showing a fragment of a handle of the container;

Figure 4 is a perspective view of a fragment of a handle, the view being taken from the opposite direction to that shown in the previous figure.

*Description.*

The herein disclosed dispenser is designed principally for dispensing condensed milks, creams and articles of similar character. A characteristic of these articles is the slowness with which they flow when being poured. Further, and as a corollary to the slow movement, it has been difficult, if not impracticable, to measure the quantity dispensed. When spoons or other ladling implements have been employed to lift the material from the container, the material has adhered so tenaciously to the ladle that it indubitably has dripped or dropped from the ladle with disagreeable effect.

In the present invention a container is provided in the shape of a bowl 9. The bowl 9 is preferably constructed of metal in artistic form, and provided at the opposite sides thereof with laterally extended handles 10. The extension of the handles 10 serves to support the extremities of the ladle 11, and a separator 12, and are each provided with mutually engaging or interlocking means for positively assuring that the latter implements will be retained against accidental dispacement from their supported positions. The ladle 11 and the separator 12 have both similar handles 13, the extremities whereof are provided with ridge-like bosses 14. The bosses 14 are designed to rest beneath the bridge member 15 of the handles 10. The bridge member 15 and the guide member 16 are separated by an open slot 17, downward through which the handles 13 of the spoon and separator 12 may be readily inserted. The inner end of the slot 17 is formed of the same dimension as the upper opening. The outer end of the slot is enlarged to form the rounded opening 18, through which the bosses 14 may be extended. When the bosses 14 pass within the opening 18, they rest under the bridge member 15, and are prevented thereby from being lifted by the overbalancing weight of the ladle 11 on the one hand, and the separator blade 12 on the other. Also, by this means the bowl of the ladle 11 and the blade of the separator 12 are held suspended within the body of the container 9, and in positions most favorable for the drainage of the said bowl and blade.

A cover 19 is provided with an annular flange 20 which closely fits the upper edge of the body of the container 9, and serves when in position to substantially seal the container. The upper edge of the container 9 has formed therein top opening vertical slots 21. Similar slots are formed in the flange 20 of the cover 19 to register with the slots 21, both sets of slots being adapted to enfold the handles 13.

It is obvious that when the cover 19 is in position on the container 9, the ladle 11 and separator 12 are held easily but firmly within the bowl of the container and are maintained in the best drainage position therein. It is also obvious that while the cover 19 remains in the closed relation to the body of the container 9, the said ladle and separator cannot be accidentally removed or otherwise displaced from their relation to the container.

When in use, the condensed milk or other substance to be dispensed, will be poured into the container, the implements arranged in positions as shown, and the cover placed upon the container. It will, of course, be understood that in actual construction the container will be larger in proportion with respect to the implements than as illustrated, and, that when the implements are in place, they will be suspended above the level of the substance within the container. After the cover has been removed, the ladle will be used to dispense a portion of the substance from the mass within the container, and the scraper will then be used to remove the surplus of the substance from the bottom of the ladle whereby to prevent drippings onto the surface supporting the container, and also to level the contents remaining within the container. With the ladle held in a tilted position over a coffee cup or the like, into which it is desired to pour condensed milk, for example, the scraper will be made use of to scrape the ladle free from all surplus of the milk, and thereafter both the ladle and scraper will be replaced in position on the container, together with the cover, substantially as shown in Figure 2. When in the position, as shown, the implements will be prevented from sliding down into the contents of the container, and any milk, which may adhere to the ladle if the scraper not be made use of, will drain off into the container, as well as from the scraper in the event of its having been used. It will thus be seen that the container, ladle and scraper combine to provide an efficient mechanism for serving heavy liquids, such as condensed milk, gravies, syrup or the like, and in a manner to prevent, or, at least, reduce to a minimum, all possible chance for the spilling of the liquid during the dispensing operation, and the dripping of the surplus thereof from the implements after the same have been in use.

*Claims.*

1. A device of the class described, comprising a container, handles formed with and extending outwardly from the opposite sides of said container, cooperative implements for use in dispensing the contents of said container, and cooperative means formed with each of said handles of the container and the handle portions of said implements whereby the implements are supported across the edge of said container with their dispensing ends disposed inwardly thereof and one spaced in parallel relation to the other.

2. A device of the class described, comprising a container, handles extending outwardly from the opposite sides of said container, cooperative implements for use in dispensing the contents of said container, slotted bridge members formed at the upper sides of said handles and having openings in the opposite sides thereof, the slots of said bridge members being adapted to receive the handle portions of said implements when the latter are laid across the edge of said container with their dispensing ends disposed inwardly thereof, and means carried at the outer end portions of the handle portions of said implements and adapted for detachable interlocking engagement with the openings of said bridge members whereby said implements are maintained in position when not in use.

3. A device of the class described, comprising a container, a handle for said container extending from the side thereof, the upper portion of said handle being provided with a slot terminating at its outer end in an enlarged portion, and a serving implement having a handle portion adapted for resting engagement with the upper edge of said container, said handle portion of the implement fitting into said slot and having a boss adapted for passage through the enlarged end of the latter for engagement with the handle of the container at the opposite side of the slot to hold the serving implement against rocking movement on the edge of the container.

HENRITA F. H. RIED.